US009934211B2

(12) United States Patent
Jennings

(10) Patent No.: US 9,934,211 B2
(45) Date of Patent: Apr. 3, 2018

(54) SYSTEM AND METHODS FOR GENERATING DERIVATIVE WEBSITES

(71) Applicant: NetSuite Inc., San Mateo, CA (US)

(72) Inventor: David Jennings, San Francisco, CA (US)

(73) Assignee: NETSUITE INC., San Mateo, CA (US)

( * ) Notice: Subject to any disclaimer, the term of this patent is extended or adjusted under 35 U.S.C. 154(b) by 598 days.

(21) Appl. No.: 14/147,182

(22) Filed: Jan. 3, 2014

(65) Prior Publication Data
US 2017/0235709 A1    Aug. 17, 2017

Related U.S. Application Data

(60) Provisional application No. 61/750,758, filed on Jan. 9, 2013.

(51) Int. Cl.
*G06F 17/22* (2006.01)

(52) U.S. Cl.
CPC ................. *G06F 17/2288* (2013.01)

(58) Field of Classification Search
CPC ........................................ G06F 17/22
USPC .......................................... 715/229
See application file for complete search history.

(56) References Cited

U.S. PATENT DOCUMENTS

| 2005/0246377 | A1 | 11/2005 | Faso |
| 2006/0271683 | A1* | 11/2006 | Ramaley ........... H04L 29/06027 709/226 |
| 2007/0220419 | A1* | 9/2007 | Stibel ................ G06F 17/30905 715/234 |
| 2009/0044128 | A1 | 2/2009 | Baumgarten et al. |
| 2011/0107294 | A1* | 5/2011 | Ionfrida ................. G06Q 30/02 717/101 |

* cited by examiner

*Primary Examiner* — Kavita Padmanabhan
*Assistant Examiner* — Tionna Burke
(74) *Attorney, Agent, or Firm* — Cooper Legal Group, LLC

(57) ABSTRACT

A system and methods for creating derivative websites based on base website and derivative site content. A content management system contains files representing multiple websites, i.e., a base website and one or more derivative versions of the base website. Each derivative version of the website consists of one of more files stored in a hierarchal chain of derivative folders that represent changes from the base website. A developer may thereby track which changes have been implemented and changes made by other developers higher in the chain of derivative workspaces than the current developer will be propagated to the current developer's derivative version of the production website.

18 Claims, 6 Drawing Sheets

SYSTEM AND METHODS FOR GENERATING DERIVATIVE WEBSITES

CROSS REFERENCE TO RELATED APPLICATION

This application claims the benefit of U.S. Provisional Application No. 61/750,758, entitled "Methods and Systems for Generating Derivative Websites," filed Jan. 9, 2013, which is incorporated herein by reference in its entirety (including the Appendix) for all purposes.

BACKGROUND

The ability of businesses to conduct transactions with customers (as well as with other businesses) over the Internet using "online storefronts" has enabled such businesses to greatly expand their potential customer base while substantially reducing costs related to maintaining "brick and mortar" businesses. However, such transactions, handled at a distance and not face-to-face, also present unique problems, particularly with regards to how merchants make their products or services known to potential buyers. Some of these problems relate to how merchants construct and maintain websites or software applications used to provide services for customers.

A web browser (sometimes referred to as a client browser or a browser) is a client software application primarily used for accessing, retrieving, presenting, and traversing website data from websites hosted by remote web servers. Although browsers are primarily intended to be used to navigate and present data contained on web-pages that are part of the Internet (the World Wide Web), they can also be used to access information provided by web servers that are part of private networks or files residing in local file systems.

A website is a set of related data files called webpages and other data files containing content (or a "link" to content) such as text, images, video, audio, etc. A single website may be hosted on one or more web servers and may thereby be made accessible to remote client computers and applications, for instance via the Internet using a web "address" known as a uniform resource locator (URL) (where as noted, the publicly accessible websites collectively constitute the "World Wide Web"). A webpage is a human-readable and computer-readable data file, typically containing text and links to other data files, such as image files. The data is intended to be displayed to a client-user in accordance with computer-readable formatting instructions that communicate to a client-application, such as a web browser, how to display the text and linked data files. Webpages may, for example, be described using (or written in) a "markup" language such as hypertext markup language (HTML) or extensible hypertext markup language (XHTML). Each webpage may contain one or more of text, images, a "button" to activate a recorded audio or video segment, etc. A linking or ordering of a website's webpages conveys a perceived structure of the website to an end user and guides the user's navigation of the website. Many websites include a homepage (or index page), which generally provides basic information about the website, links to the website's other webpages/content, as well as links to supplementary information (such as an "about" page, a "contact" page, and/or a "site map" page). Typically, at the direction of a user, a client application (such as a web browser) will access a webserver and request a particular page of a website (e.g., based on a URL or other form of identifying the location of a desired page). In response, the webserver will transmit the appropriate web page or set of related web pages and other data files to the client application and the application will render the webpage content according to its formatting instructions for display to a user.

Webpages may be static or dynamic, that is they may contain static and/or changeable content. A website's static web pages (which may be some or all of the site's web pages) are stored on a web server in the format that is sent to the client web browser, and are commonly written in HTML. Simple forms, fixed marketing examples of websites, and other fixed content websites are often static websites (i.e., they contain solely or predominantly static web pages), because they present pre-defined, static information to a user. This may include information about a company and its products and services that is provided through text, photos, animations, audio/video segments, and interactive menus and navigation tools. This type of website usually displays the same information to all visitors. Similar to the act of handing out a printed brochure to customers or clients, a static website will generally provide consistent, standard information for an extended period of time. Although the website owner may make updates periodically, it is a manual process to edit the text, photos, and other content and may only require basic website design skills and software tools.

In contrast, a dynamic webpage (i.e., a web page that includes at least some dynamic or "active" content) displays content that varies based on parameters provided by a client browser. This permits the web page to be "customized" in response to characteristics of the viewer, the viewer's location, etc. For example when a user accesses a website's "log-in" page, the user typically provides a user name and password, and activates a log-in "button". In response to the "button" activation, the user's web browser transmits the user name and password to a URL linked to the "button." In response, the web server hosting the website may, rather than simply deliver a predefined static file, instead execute a script that confirms the user name and password are a valid combination, followed by delivering content appropriate to that user. The user specific content may be selected based on data known about the user based on the current or on a previous session, such as user location, the user's previous search histories, the user's "click-through" behavior, etc.

Modern websites can be extremely robust and feature rich, providing many advantages to both the operators and users of the websites. However, the development of such websites can be an extremely time consuming and complex process, requiring the cooperation and coordination of many teams of developers. "Web development" is a broad term for the work involved in developing a public or private website. Web development can range from developing a simple static single page of plain text to complex web-based internet applications, eCommerce platforms, and social network services. Some tasks to which web development commonly refers include web design, web content development, client liaison, client-side/server-side scripting, web server and network security configuration, and eCommerce development. For larger organizations and businesses, web development teams may consist of hundreds of people. Further, web development may be a collaborative effort between departments rather than the domain of a designated department, and/or may be a collaborative effort between multiple software engineers, content editors or content developers in different locations.

Because of the complexity of some websites and/or web pages, a team of developers may work on updates, corrections, or maintenance of a website concurrently. This can create potential problems if team members are working on related portions of a website, such as web pages that depend upon one another for content or presentation of information. In such a situation, changes made to one section of a website may not be reflected in web pages or other information that another developer is using as the basis for their own work. Further, it is typically desirable that at least some features and functions of a website be available to users even while future website features are being developed.

Because of these potential problems and in recognition of the manner in which website development is performed, it would be advantageous for different developers to be able to simultaneously work on independent future (i.e., derivative) versions of an existing base website, where the base site itself may be subject to ongoing changes and updates. For example, an existing eCommerce website may be hosted on a webserver and be accepting traffic from users/clients. However, even while the website is operating, there may be developers working on short-term patches to the website or making other changes, while other developers may be making long-term changes to the website such as creating a new seasonal version, an updated version for the next year, or developing an entirely new section of the site (such as a "factory" store offering discounted goods).

Conventional approaches to providing a software development environment that enables website developers to simultaneously work on independent future versions ("derived" versions) of a base website, while still permitting updates to the base website itself, suffer from one or more disadvantages related to administrative overhead or potential difficulties in scaling site management workflows to meet the demands of complex web-sites and businesses that operate multiple web-sites. Embodiments of the invention address this and other needs both individually and collectively.

SUMMARY

The terms "invention," "the invention," "this invention" and "the present invention" as used herein are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim. This summary is a high-level overview of various aspects of the inventive system and methods for responding to a request for a web page containing dynamic content by generating and delivering a static version of the page and the requested content.

Embodiments of the invention are directed to a system and associated methods for generating derivative websites by combining the files corresponding to a base website with files representing desired changes to the base website. Specifically, the embodiments described herein are directed to a system and methods for generating at least one derivative version of a base website, where the base website is generated via a browser application interpreting base content stored in a base directory containing at least one base website file, and the derivative version(s) of the base website represent modifications to the base content. For each derivative version of the base website to be generated, an embodiment of the inventive method includes defining a corresponding derivative directory for each base website file containing content to modified; creating a corresponding derivative file for each base website file containing content to be modified, the corresponding derivative file containing modifications to the content of the base website file; and storing the corresponding derivative file in the corresponding derivative directory. The derivative versions of the base website may then be generated by causing a browser application to determine, for each base website file, whether a corresponding derivative file is located in a corresponding derivative directory and, if a corresponding derivative file is located in a corresponding derivative directory, then interpreting the corresponding derivative file or, if no corresponding derivative file is found, then interpreting the base website file.

In one embodiment, the invention is directed to a method for creating a derivative version of a base website, the base website being generated by a server interpreting base website content stored in a base directory which contains at least one base file, the derivative version of the base website including modifications to the base content, wherein for each derivative version of the base website created, the method includes (a) defining a corresponding derivative directory for the base directory, the derivative directory containing content to be modified;

(b) creating a corresponding derivative file for each base file containing content to be modified, where the corresponding derivative file contains modifications to the content of the base file containing content to be modified, and storing the corresponding derivative file in the corresponding derivative directory; and (c) creating the derivative version of the base website by causing the server to, for each base file in each base directory:
  (i) determine whether a corresponding derivative file is located in a corresponding derivative directory;
  (ii) if a corresponding derivative file is located in a corresponding derivative directory, then interpreting the corresponding derivative file; and
  (iii) if a corresponding derivative file is not located in a corresponding derivative directory, then interpreting the base file.

In another embodiment, the invention is directed to an apparatus for creating a derivative version of a base website, the base website being generated by interpreting base website content stored in a base directory which contains at least one base file, the derivative version of the base website including modifications to the base content, wherein the apparatus includes a processor programmed to execute a set of instructions a data storage element in which the set of instructions are stored, wherein when executed by the processor the set of instructions cause the apparatus to, for each derivative version of the base website created, (a) define a corresponding derivative directory for the base directory, the derivative directory containing content to be modified;

(b) create a corresponding derivative file for each base file containing content to be modified, where the corresponding derivative file contains modifications to the content of the base file containing content to be modified, and storing the corresponding derivative file in the corresponding derivative directory; and
(c) create the derivative version of the base website by causing the apparatus to, for each base file in each base directory:
  (i) determine whether a corresponding derivative file is located in a corresponding derivative directory;
  (ii) if a corresponding derivative file is located in a corresponding derivative directory, then interpreting the corresponding derivative file; and
  (iii) if a corresponding derivative file is not located in a corresponding derivative directory, then interpreting the base file.

In yet another embodiment, the invention is directed to a system for creating a derivative version of a base website, the base website being generated by interpreting base website content stored in a base directory which contains at least one base file, the derivative version of the base website including modifications to the base content, wherein the system includes
a data storage element containing a base website directory and a derivative website directory, the base website directory containing one or more base website content files and the derivative website directory containing one or more derivative website content files; and
a computing or data processing element configured to receive a request for the derivative version of the base website and in response to, for each base website content file in the base website directory:
  (i) determine whether a corresponding derivative website content file is located in the derivative website directory;
  (ii) if a corresponding derivative website content file is located in the derivative website directory, then interpreting the corresponding derivative website content file; and
  (iii) if a corresponding derivative website content file is not located in the derivative website directory, then interpreting the base website content file.

Other objects and advantages of the present invention will be apparent to one of ordinary skill in the art upon review of the detailed description of the present invention and the included figures.

BRIEF DESCRIPTION OF THE DRAWINGS

Various embodiments in accordance with the present disclosure will be described with reference to the drawings, in which.

DETAILED DESCRIPTION

Figure 1:
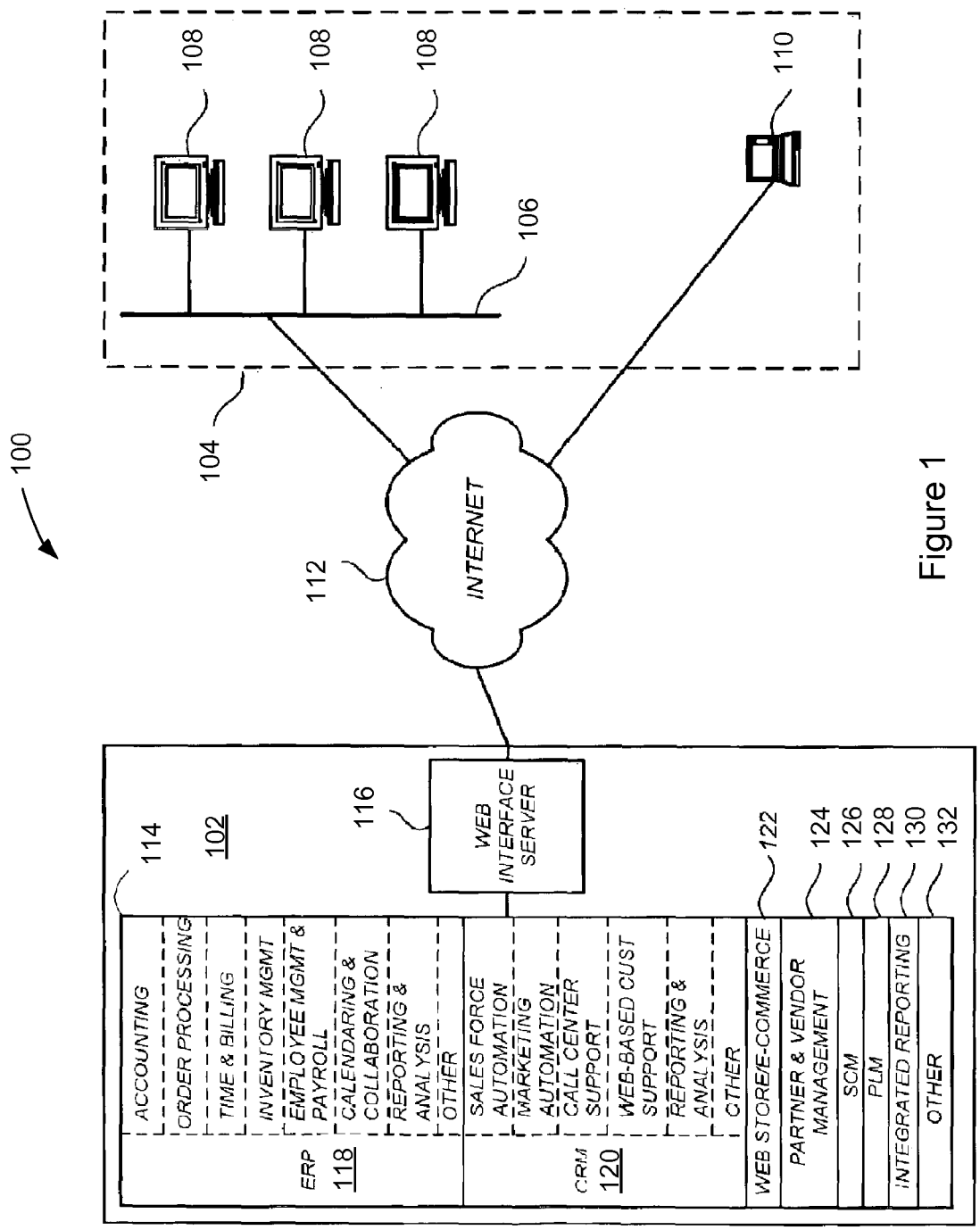
FIG. 1 is a schematic diagram depicting aspects of an example computing environment in accordance with at least one embodiment of the invention.

This description discusses illustrative embodiments of the inventive system and methods for generating derivative websites. It is presented with reference to the accompanying drawings in order to provide a person having ordinary skill in the relevant art with a full, clear, and concise description of the subject matter defined by the claims which follow, and to enable such a person to appreciate and understand how to make and use the invention. However, this description should not be read to limit the scope of the claimed subject matter, nor does the presence of an embodiment in this description imply any preference of the described embodiment over any other embodiment, unless such a preference is explicitly identified herein. It is the claims, not this description or other sections of this document or the accompanying drawings, which define the scope of the subject matter to which the inventor and/or the inventor's assignee(s) claim exclusive entitlement.

The subject matter of one or more embodiments of the invention is described herein with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying or requiring any particular order or arrangement among or between various steps or elements except when the order of individual steps or arrangement of elements is explicitly required.

Embodiments of the invention will be described more fully herein with reference to the accompanying drawings, which form a part hereof, and which show, by way of illustration, exemplary embodiments by which the invention may be implemented and practiced. The invention may, however, be embodied in different forms and should not be construed as limited to the embodiments set forth herein; rather, these embodiments are provided so that this disclosure will be thorough and complete, and will convey the scope of the invention to those skilled in the art.

Among other embodiments, the invention may be embodied in whole or in part as a system, as one or more processes, operations, methods, or functions, or as one or more apparatuses or devices. Embodiments of the invention may take the form of an entirely hardware implemented embodiment, an entirely software implemented embodiment or an embodiment combining software and hardware aspects. For example, in some embodiments, one or more of the operations, functions, processes, or methods described herein may be implemented by a suitable processing element (such as a processor, microprocessor, CPU, controller, etc.) that is programmed with a set of executable instructions (e.g., software instructions), where the instructions may be stored in a suitable data storage element. The processor, microprocessor, CPU or controller may be a component or element of a computing device or data processing device or platform, such as a server and an associated data storage or database. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

As recognized by the inventor, it would be advantageous to provide a website development environment that allows a variety of developers to work on independent updates to a website in parallel, while propagating each developer's changes to the rest of the development team, and while also providing a means for the developers to prioritize various features under development (i.e., so a developer working on a minor update does not inadvertently interfere with the work of other developers attempting to implement a significant and complex new feature). In the context of an integrated business system or multi-tenant data processing platform, such a development environment would also be advantageous so that changes implemented to different functional modules (e.g., eCommerce, ERP, or CRM) could be performed in parallel and the compatibility of the various changes could be monitored dynamically. This would provide a more efficient means of developing and maintaining a complex software platform than is available using current ways of addressing the problems that may be caused by a collaborative software development environment.

As noted, problems can arise during website development when multiple developers make independent changes to the content of the website. For example, if a first developer makes changes to particular file or feature, it may be incompatible with the changes made by a second developer. This type of problem is usually handled by having each developer make a copy of the files on the web server that compose the base website, and then begin work by making changes to the copied files, thereby creating a derivative version of the base site. The derivative version of the base site can be hosted using conventional techniques because the derivative is, in and of itself, a complete website. When the developer finishes their work and wishes to update the actual base site, this is accomplished by copying the updated files. However, this approach has the disadvantage that any changes made to the base site files by other developers would presumably be lost.

Some of the disadvantages of this approach may be overcome by using a conventional version control system to track changes to the site using branches and versioning. However, to integrate changes from a derived site back to a base site, the developer would need to detect all changes made, for example by determining the difference between each file in the new site compared to each file in the base site, and then merge the changes into the base site. A drawback to this approach is that changes may be made to the base site while other developers are working on newer version of the website and hence they would be accessing outdated versions of the underlying base site files. Each developer would have to track these changes to the base site and merge the new versions of the base site created by other developers into the developer's own derivative site on an ongoing basis in order to stay current with changes to the base site. This is both inefficient and not properly scalable as the complexity of a website and the number of developers increases.

Thus, as recognized by the inventor, providing a hierarchal content management system for web page development may provide a solution to these types of problems. Specifically, in some embodiments, the invention includes a content management system that enables the hosting of a base site while allowing a developer to work in a derivative file space containing the changes made by that developer to base website files, and which itself may be hosted as its own derivative website. When viewed through a client web browser, the derivative website may reflect the base site with all changes applied and can be navigated as though it were a live, hosted site. Such a content management system may provide a developer with the ability to immediately view how the changes will look and function when applied to the base website. At the same time, by providing each of the developers working on the base website with their own derivative file space (and if desired, advantageously "chained" together in a predefined hierarchy), each developer's derivative site will automatically reflect any changes to the base website and any higher ranked derivative sites, while the developer's changes to the base website will be propagated down to any lower ranked derivative sites.

The inventive derivative file workspace functions as a content management system, and acts as a file system which serves as a container for files representing multiple websites (i.e., a base website and one or more derivative versions of the base website). From the content management system's perspective, each version of the website consists of one of more files stored in a hierarchal chain of folders. Chains of derivative sites may be any number of sites or versions deep. In one embodiment, URLs are created for various versions of the website, where the name of a file stored in a folder and the folder name may be combined to create a URL. The top level folder of a given website version is typically called a hosting root, where a hosting root becomes a live, visible website able to accept traffic by being associated to one or more domains.

As noted, one type of software development task in which an embodiment of the invention may be used is related to the management and development of a multi-tenant data processing platform. Such a platform may be used to provide multiple tenant users with access to business related data and applications (such as eCommerce, ERP, CRM, HR, etc.). Typically, such a platform is accessed by a tenant using a browser which navigates to a website or series of websites to access data, to process the data using a platform based application, and to provide outputs in the form of data, graphs, reports, etc. Because of the importance of certain business related functions to tenants, it is important that the platform be operating continuously and that modifications or maintenance be performed in a way that has a minimal impact on users. This means that the changes or updates made to the website(s) need to be implemented in a way that is transparent to the tenants and does not introduce a delay in the tenants being able to access their data and applications. Further, because platform maintenance and updating is typically performed by teams of developers, those developers need to be able to efficiently and accurately control how derivative websites are generated and combined into a revised version of the platform.

Note that although use of an embodiment of the invention in the context of a multi-tenant data processing platform will be discussed in greater detail herein, an embodiment of the invention may be used in other environments or contexts as well. For example, an embodiment of the invention may be used as part of developing a website by a team of dispersed software developers, as part of developing a group of websites that may use some portion of common content, as part of developing a set of functional modules that have common aspects, etc.

As further background to the use of an embodiment of the invention in the development and maintenance of a multi-tenant data processing platform, it is noted that in addition to the advantages related to customer access created by the Internet, the ability of business users to access crucial business information has been greatly enhanced by the proliferation of IP-based networking together with advances in object oriented Web-based programming and browser technology. Using these advances, systems have been developed that permit web-based access to business information systems, thereby allowing any user with a browser and an Internet or intranet connection to view, enter, or modify business information.

For example, substantial efforts have been directed to Enterprise Resource Planning (ERP) systems that integrate the capabilities of several historically separate business computing systems into a common system, with a view toward streamlining business processes and increasing efficiencies on a business-wide level. By way of example, the capabilities or modules of an ERP system may include: accounting, order processing, time and billing, inventory management, employee management/payroll, and employee calendaring and collaboration, as well as reporting and analysis capabilities relating to these functions.

In a related development, substantial efforts have also been directed to integrated Customer Relationship Management (CRM) systems, with a view toward obtaining a better understanding of customers, enhancing service to existing customers, and acquiring new and profitable customers. By way of example, the capabilities or modules of a CRM system may include: sales force automation (SFA), marketing automation, contact list, call center support, and web-based customer support, as well as reporting and analysis capabilities relating to these functions. With differing levels of overlap with ERP/CRM initiatives and with each other, substantial efforts have also been directed toward development of increasingly integrated partner and vendor management systems, web store/eCommerce systems, product lifecycle management (PLM) systems, and supply chain management (SCM) systems.

Both functional advantages and strategic advantages may be obtained through the use of an integrated business system comprising ERP, CRM, and other business capabilities, particularly where the integrated business system is integrated with a merchant's eCommerce platform and/or "web store." For example, a customer searching for a particular product can be directed to a merchant's website and presented with a wide variety of product and/or services from the comfort of their home computer, or even from their mobile phone.

When a customer initiates an online sales transaction via a browser-based interface, the integrated business system can not only process the order, update accounts receivable, update inventory databases, and update other ERP-based systems, but can also automatically update strategic customer information databases and other CRM-based systems. These modules, along with other applications and functions may be seamlessly integrated and executed by a single code base accessing one or more integrated databases as necessary, thereby forming an integrated business management platform or multi-tenant data processing platform. This integration can be further leveraged to provide additional advantages by incorporating inter-module communication.

However, each merchant is unique, both in terms of their commercial offerings, desired customer demographics, and marketing techniques, but also in terms of their internal business organization and philosophies. Therefore, a truly robust integrated business solution should not only have a rich set of features, but also be highly customizable for each business' needs. This customization of the integrated business system applies both internally, in terms of the system's architecture that is generally not visible to users, and externally, in terms of the interfaces the system provides both to customers and to the merchant's employee users who operate the "backend" system.

FIG. 1 is a diagram illustrating network architecture 100 that includes an integrated business system 102 (such as a multi-tenant data processing platform) and an enterprise network 104 in which an embodiment of the invention may be implemented or used. Enterprise network 104 is associated generally with a business enterprise, such as a merchant. Alternatively, and in accordance with the advantages of an application service provider (ASP) hosted integrated business system, the business enterprise may comprise fewer or no dedicated facilities or business network at all, provided that its end users have access to an internet browser and an internet connection. For simplicity and clarity of explanation, enterprise network 104 is represented by an on-site local area network 106 to which a plurality of personal computers 108 are connected, each generally dedicated to a particular end user (although such dedication is not required), along with an exemplary remote user computer 110 that can be, for example, a laptop or tablet computer of a traveling employee having internet access through a hotel, coffee shop, a public Wi-Fi access point, or other internet access modality. The end users associated with computers 108 and 110 may also (or instead) possess an internet-enabled smartphone or other electronic device (such as a PDA) having wireless internet access and/or other data synchronization capabilities. Users of enterprise network 104 may interface with integrated business system 102 by means of any suitable network or networks, such as the Internet 112.

Integrated business system 102, which may be hosted by a dedicated third party ASP, comprises an integrated business server 114 and a web interface server 116, coupled as shown in FIG. 1. Note that either or both of integrated business server 114 and web interface server 116 may be implemented on one or more different hardware systems and components, even though represented as singular units in FIG. 1. Integrated business server 114 provides a basis for a multi-tenant data processing platform which may be used to deliver cloud-based data access, data storage, and data processing services to multiple tenants, where the users associated with enterprise network 104 may constitute a single tenant. The services provided to tenants by integrated business server 114 may be delivered in accordance with any suitable business model, including but not limited to as a web-service, as Software-as-a-Service (SaaS), etc. Integrated business server 114 typically comprises an ERP module 118 and may further comprise a CRM module 120. In many cases, it will be desirable for ERP module 118 to share methods, libraries, databases, subroutines, variables, etc., with CRM module 120 and with other functional modules of server 114.

ERP module 118 may include, but is not limited to nor required to include, a finance and accounting module, an order processing module, a time and billing module, an inventory management and distribution module, an employee management and payroll module, a calendaring and collaboration module, a reporting and analysis module, and other ERP-related modules. CRM module 120 may include, but is not limited to nor required to include, a sales force automation (SFA) module, a marketing automation module, a contact list module (not shown), a call center support module, a web-based customer support module, a reporting and analysis module, and other CRM-related modules. Integrated business server 114 may further provide or enable other business functions, including a web store/eCommerce module 122, a partner and vendor management module 124, and an integrated reporting module 130. An SCM module 126 and/or PLM module 128 may also be provided. Web interface server 116 is configured and adapted to interface with integrated business server 114 to provide web-based user interfaces to end users of enterprise network 104.

The integrated business system shown in FIG. 1 may be hosted on a distributed computing system made up of at least one, but typically multiple, "servers." A server is a physical computer dedicated to run one or more software services intended to serve the needs of the users of other computers in data communication with the server, for instance via a public network such as the Internet or a private "intranet" network. The server, and the services it provides, may be referred to as the "host" and the remote computers, and the software applications running on the remote computers being served may be referred to as "clients." Depending on the computing service that a server offers it could be referred to as one or more of a database server, file server, mail server, print server, web server, etc. A web server is often a combination of hardware and the software that helps deliver content, commonly by hosting a website, to client web browsers that access the web server via the Internet.

Figure 2:
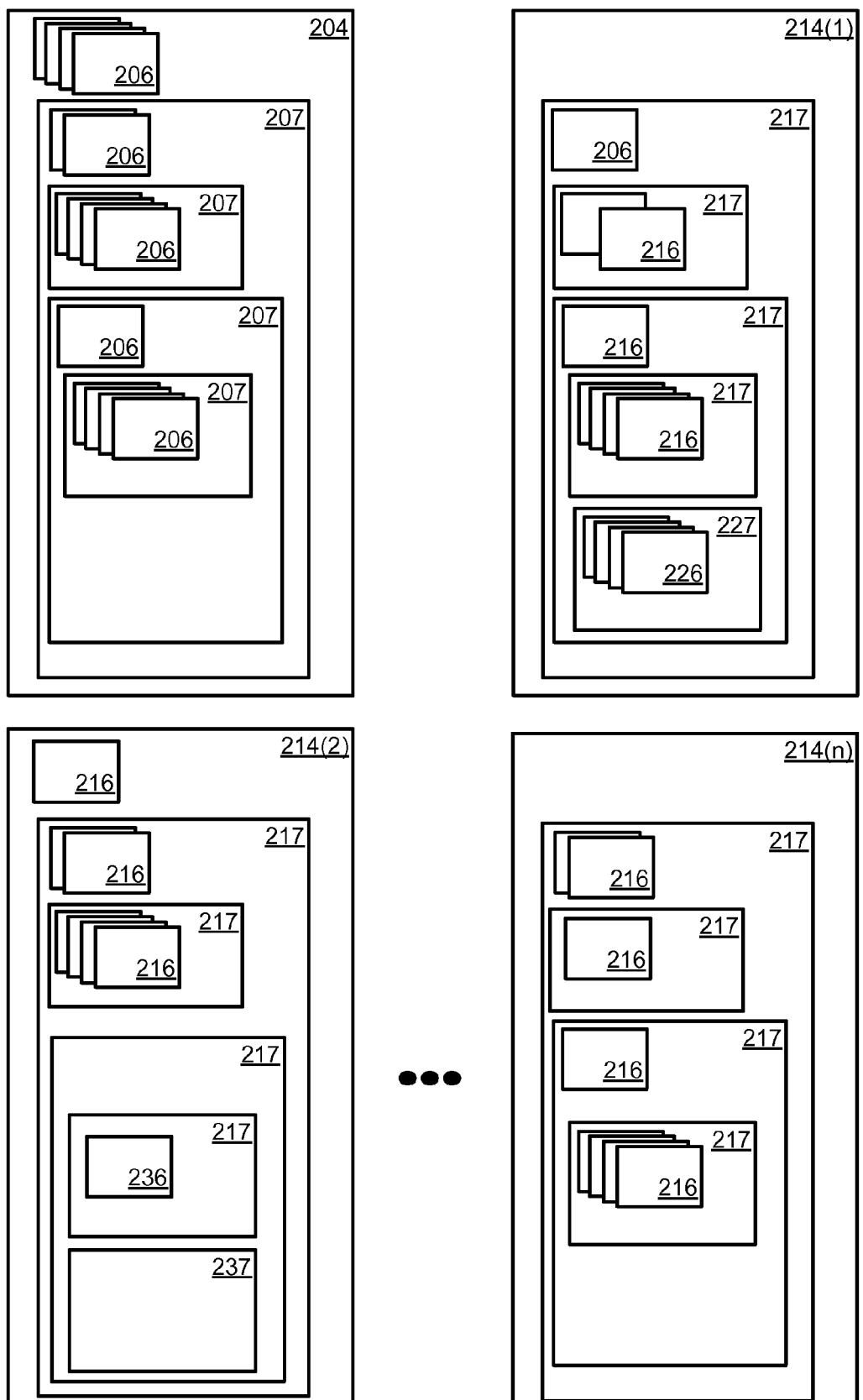
FIG. 2 is a functional block diagram depicting aspects of a content management system in accordance with at least on embodiment of the invention.

FIG. 2 is a diagram illustrating a schematic representation of aspects of a content management system 200 that may be used in implementing an embodiment of the inventive system and methods. Content management system 200 may be hosted on a web server (not shown) and typically includes a base site hosting root directory 204 for hosting files 206, advantageously organized in sub-folders 207, corresponding to a base website (not shown). The content management system may also include a hierarchal chain of 1 through n development workspaces, each including a derivative hosting directory 214 (i.e., 214(1), 214(2), . . . 214(n)) for hosting change files 216, advantageously organized into corresponding sub-folders 217, and corresponding to 1 through n derivative websites (not shown). In accordance with an embodiment of the invention, the development workspaces include those folders and files representing alterations or differences from the corresponding base site folders and files.

In one embodiment of the inventive system and methods, web site developers working on derivative versions of a base website may create, edit, or otherwise modify files in a development file work space that, rather than consisting of copies of all the files 206 representing the base website, instead consists only of the change files 216 that the developer needs to modify to create the desired changes to the base site and produce the derivative website. When a nth derivative version of the base website is generated, the inventive system and methods compare the base files 206 and folders 207 to the change files 216 and folders 217 in the nth derivative hosting directory 214(n) and, for each base file 206 composing the base website, if there is a corresponding version of the file 216 in the derivative hosting directory 214(n), then the derivative file 216 is used in to generate the corresponding content of the derivative version of the website. If there is no corresponding version of a given base file 206 in the derivative hosting directory, then the base file 206 is used in the generation of the derivative version of the website. Additional files 226 and folders 227 may also be included in the derivative hosting directory 214 and special derivative files 236 may represent a deletion or renaming of a corresponding base file in the base hosting directory.

Because the developer's workspace contains files representing a change from the base website, it is relatively simple for the developer to track which changes have been implemented at any given time. Additionally, changes made to the base website, for instance by other developers higher in the hierarchical chain of derivative workspaces than the current developer, will be propagated to the current developer's derivative version of the production website.

As described herein, in an embodiment of the invention, a developer works in a unique space that instead of being a complete and independent website is a website consisting only of differences between the developer's work and a base site. Thus, the lack of a file in the workspace means to use the base site's corresponding file, and the presence of a file means to override the base site's corresponding file. In one embodiment, there can be a file that represents a file deletion or rename, which causes the base site file to effectively be removed, or renamed.

The developer's derivative site consists of differences, so it's a relatively straightforward matter to determine what has been changed, as only changed files will exist in the site. In addition, changes made to the underlying files which have not been overridden (replaced) in the derivative site will appear when viewing the derived site.

As examples of the inventive process:
(1) If site B is derived from site A, then the content delivered from any URL u is:
if exists (u in B) then (u from B) else (u from A); and
(2) Likewise, a site C could be derived from B, which is derived from A:
if exists (u in C) then (u from C) else if exists (u in B) then (u from B) else (u from A). Note that derivative site chains may be any number of sites deep.

In general, folders can contain any kind of static Web content, such as (but not limited to) HTML documents, .css and .js files, images, video and sound clips, and downloadable files. These are all files whose returned content is the content contained in the file. There may also be support for a type of folder that can host an application. An application consists of a number of files implementing request handlers which are written in a specific scripting language. A request handler is a type of file whose returned content is generated by executing the code contained within the file. Applications may support the concept of an overlay, meaning that multiple copies of the application may exist within the same site, where one or more of the applications represent changes to the other applications. A precedence model may be used to determine the order in which files from one application overrides the files from another application. A third type of folder may contain template files. A feature of the inventive system is a capability referred to as a "template combiner". The template combiner, driven by a configuration file, looks for files of a related type, and then combines all related files into a single file which contains the merger of all the content, with support for ordered combination and potential optimization of the combined result.

In one embodiment of inventive system and methods, certain types of content may be detected and processed accordingly. For example, embodiments of the invention may differentiate between the following types of content and accordingly utilize specific processing techniques:
    static content (such as images and pages);
    dynamic (or active) executable content (such as scripts and applications); and
    template content.
Note that in the context of the invention, the term "template" may have a broader meaning than typically associated with that term. For example, in the context of the invention, a "template" may be a functional fragment of text-based content which by itself provides a complete unit of functionality to a Web page, but which can be aggregated with other units of content of the same type for delivery as a unified piece of content assembled from multiple individual units. Examples of such template content include (but are not limited to) text-based content (.txt), fragments of JavaScript (.js), and fragments of stylesheets (.css).

Each of the kinds of content may benefit from specific handling when viewing the derived site in a situation where changes have been made to the content in either the base website or the derived site. In one embodiment, a derivative version of a website may override all three types of content as provided from a base website, resulting in a combination of the base content with the derivative content.

For example, with regards to static content, for each base website static file in the base hosting directory, if a corresponding derivative static file exists in the derivative hosting directory, then the derivative static file is used when viewing the corresponding derivative website. Otherwise, the base website static file is used. Note that interdependent static components of a site may come from different locations. For example, if a static page references images and one of the images is changed in the derivative site, then viewing the derivative site would display the base site's page with the derivative site's image.

Dynamic/executable content that is located in the derivative and/or base website directories may be combined in a similar manner as used for static content. Note that interdependent executable components of a site may come from different levels in the hierarchical chain. For example, a single script file may be changed in in a derivative folder, and the content would be run from the derivative website directory, but would include content contained in the base website. Note that in this example, if run from the base website directory, derivative content would not be incorporated, and only base website behavior would be observed. Changes made to code in the development workspace are incorporated into the base application dynamically; in the derivative version of the website, the application's execution will reflect the derivative site changes.

Embodiments of the inventive system and methods may also support application overlay, wherein multiple copies/versions of an application may exist within the same site, and one or more of the copies/versions represent changes with respect to other of the copies/versions. In this situation, a predefined precedence model may determine the order in which files (or other sources of code or data) from one version of an application override the files from another version. Such a precedence model would apply to a situation in which multiple application versions are running from within one site layer within a derivative hosting chain. Code changes in the derivative site are incorporated into the application and it executes with those changes being made. Note that derivative hosting may be made to operate with application overlays. In one embodiment, multiple versions of an application within a site may first be combined to form an effective net representation of the application. The process is repeated in each of the overlay sites. Then, an overall derived work is created by combining the combined files from the version in the derivative site with the combined files from the base site.

As mentioned, embodiments of the inventive system and methods may include a feature for combining template files. A template combining process may be driven by a configuration file that looks for files of a related type and then combines all related files found into a single file, which represents a merger of the related content. Template content is then combined from the derivative sites, with that content including all template file overrides. In a standalone site with no overlays, the template combining process combines all template files from a specified set of folders as per the instructions contained in the configuration file. However, when the template combining process is used with respect to a derivative site, it first creates a dynamic overlay of the sites, and then runs the template combining process against the effective derivative site, thereby producing combined template files that include all work from base sites plus all changes found in derivative sites. In some embodiments, the template combining process may include support for ordered/ranked file combination and optimization of various aspects of the combined result.

Figure 3:
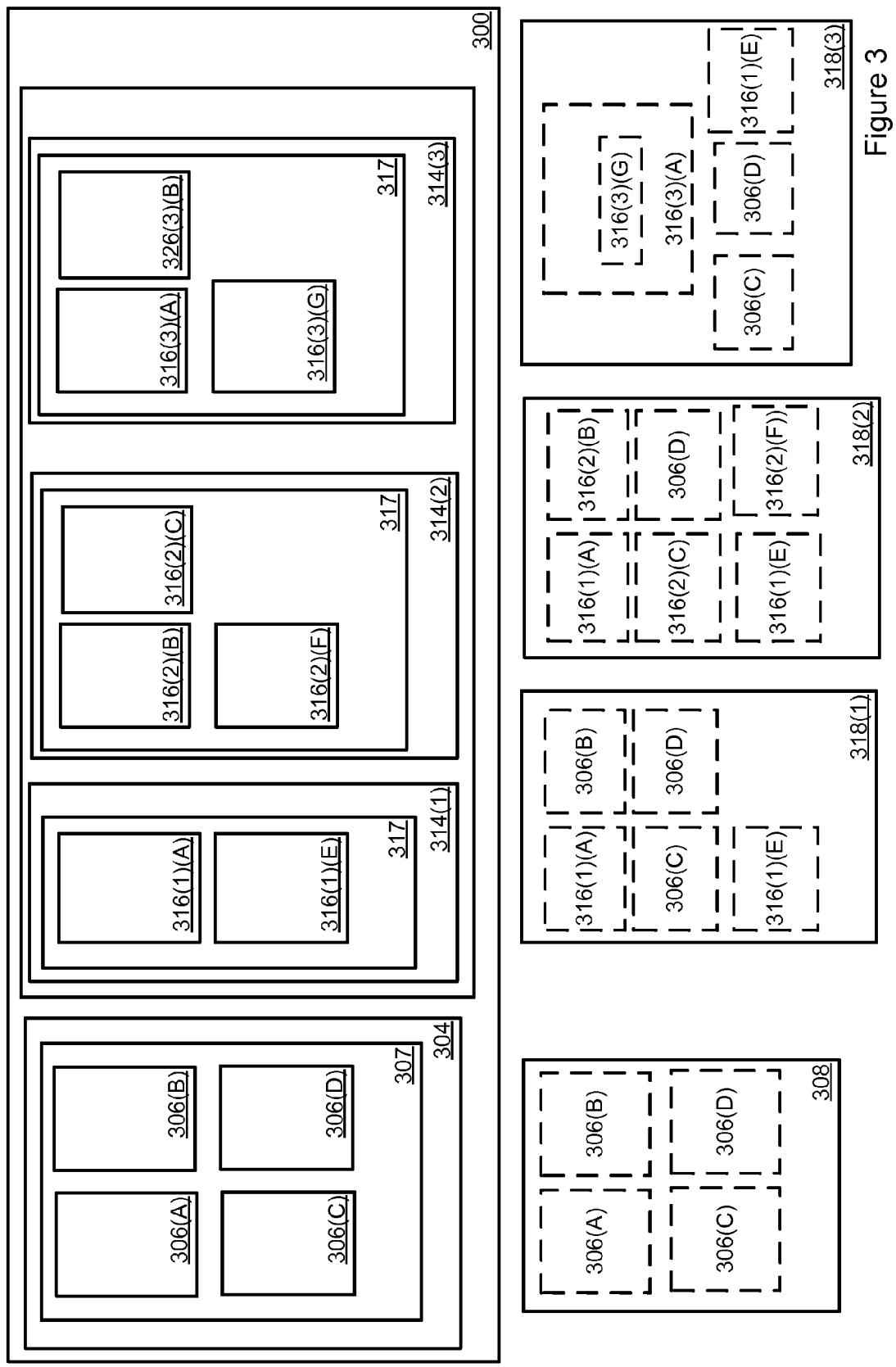
FIG. 3 is a diagram illustrating an example of the inventive content management system 300, such as described with reference to FIG. 2.

FIG. 3 is a diagram illustrating an example of the inventive content management system 300, such as described with reference to FIG. 2. When a browser requests content from the base website 308, the content delivered by the base hosting root directory may consist of files 306(A-D) stored in a single folder 307 of a base hosting root directory 304, where files 306(A) and (B) may, by way of example only, consist of HTML code and files 306(C) and (D) may, by way of example only, be images referenced by files 306(A). A first web developer may be assigned to a derivative hosting directory 314(1) and may wish to test adding an additional image E to the base website 308. In accordance with an embodiment of the inventive system and methods, the developer may create a folder 317 containing files 316(1)(A) and 316(1)(E) in the derivative hosting directory 314(1), where file 316(1)(E) corresponds to the image that the developer wishes to add and file 316(1)(A) is a copy of base file 306(A), modified to contain a link to file 316(1)(E). In this example, the content delivered by the first derivative version 318(1) of the base website 308 will include the content found in files 306(B, C, D) and files 316(1)(A, E).

A second developer may be assigned to a second derivative hosting directory 314(2) and may wish to (effectively) alter the base website 308 by modifying the text and/or formatting defined in file 308(B), add an additional image F, and replace the image found in file 306(C) with a different image C'. In accordance with an embodiment of the inventive system and methods, the developer may save files 316(2)(B)(C) and (F) in a folder 317 stored in derivative hosting directory 314(2), where file 316(2)(B) is a copy of base file 306(B), modified to reflect the desired text and/or formatting changes and includes a link to file 316(2)(F), file 316(2)(C) corresponds to the replacement image C' for the image C in base file 306(C), and file 316(2)(F) corresponds to the new image F. In this example, the content delivered by the second derivative version 318(2) of the base website 308 will reflect the base website as modified by the files in the first derivative hosting directory 314(1), further modified by the files found in the second derivative hosting directory 314(2). In other words, the second derivative website 318(2) will consist of the content delivered by files 316(1)(A), 316(2)(B), 316(2)(C), 306(D), 316(1)(E), and 316(2)(F).

A third developer may be assigned to a third derivative hosting directory 314(3) and may wish to (effectively) alter the base website 308 by deleting the content of file 306(B) and adding dynamic content, such an executable script, to the content of file 306(A). In accordance with an embodiment of the inventive system and methods, the developer may save files 316(3)(A and G) and file 326(3)(B) in a folder 317 stored in derivative hosting directory 314(3), where file 316(3)(G) contains the desired executable script and file 316(3)(A) is a copy of base file 306(A), modified to call file 316(3)(G). File 326(3)(B) is a file that informs the content management system to ignore the corresponding file 306(B), as well as any corresponding derivative files, such as file 316(2)(B), when generating the derivative website 318(3). In this example, the content delivered by the third derivative version 318(3) of the base website 308 will reflect the files in the root hosting directory as modified by the files in the first derivative hosting directory 314(1), further modified by the files found in the second derivative hosting directory 314(2), and further modified by the files found in the third derivative hosting directory. In other words, the third derivative website 318(3) will consist of the content delivered by files 316(3)(A) (which will execute the script found in file 316(3)(G)), 316(2)(C), 306(D), and 316(1)(E) (File 316(2)(F) is referenced only by 316(2)(B); since file 316(2)(B) is being ignored, there is nothing to reference file 316(2)(F)).

Figure 4A:
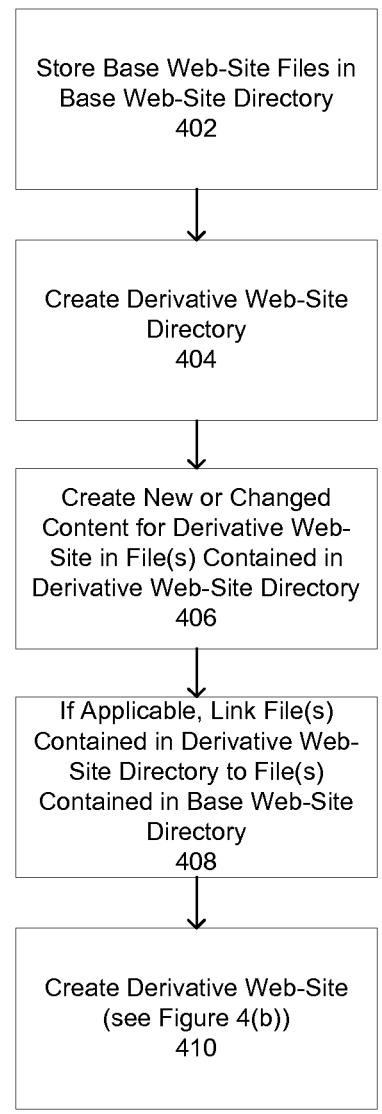
FIGS. 4(a) and 4(b) are flowcharts or flow diagrams illustrating a process, method, function or operation for creating and managing the development of a derivative web-site that may be implemented in accordance with an embodiment of the invention.
Figure 4B:
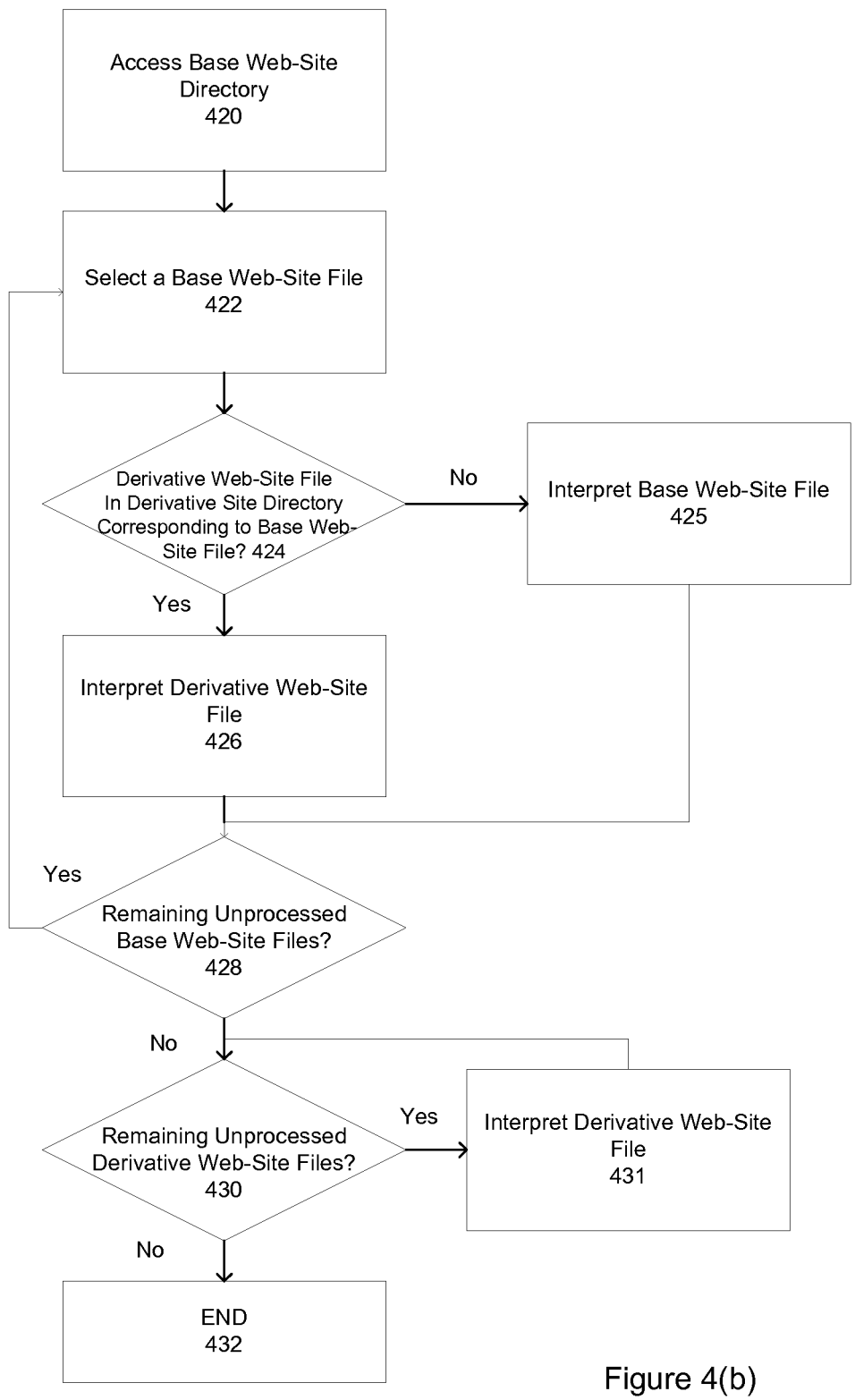

FIGS. 4(a) and 4(b) are flowcharts or flow diagrams illustrating a process, method, function or operation 400 for creating and managing the development of a derivative web-site that may be implemented in accordance with an embodiment of the invention. One or more of the steps or stages shown in the figures may be executed by a properly programmed microprocessor, controller, central processing unit (CPU), etc. as part of implementing the invention. Such a microprocessor, controller, central processing unit, etc. may be incorporated into a suitable device, apparatus, system, or platform such as a server, client device, or other form of computing device.

As shown in FIG. 4(a), one or more files for a base web-site may be stored in a base web-site directory (step or stage 402). As noted, these files may contain static or dynamic/active content and represent the content used to construct a base web-site. Next, a directory for a derivative web-site is created (step 404). As noted, this represents a storage area for one or more of the files that will be used for generating a derivative web-site. Next, new or changed content for the derivative web-site is placed into one or more files in the derivative web-site directory (step 406). As described herein, one or more of those files may contain a "link" or reference back to a file or files contained in the base web-site directory (step 408), such as in the case where new content is built onto previously existing content. The derivative web-site is then created from the files contained in the base web-site and/or derivative web-site directories in accordance with the process, method, function or operation described with reference to FIG. 4(b) (step 410). Note that the derivative site is not "generated" in the manner of a typical website, but instead is a composite site that is expressed as an overlay of the derivative site hierarchy onto the base site.

As shown in FIG. 4(b), the process of creating a derivative web-site may begin by the accessing of a base web-site directory (step or stage 420). A base web-site file is then selected for processing (step 422). The base web-site file may be selected based on one or more factors, parameters, or considerations that are relevant to the generation of a web-site. Next, the invention determines if the derivative web-site directory contains a file that corresponds to the selected base web-site file (step 424). If the derivative web-site directory contains a file that corresponds to the selected base web-site file (corresponding to the "Yes" branch of step 424), then the derivative web-site file is interpreted as part of creating the derivative web-site (step 426). However, if the derivative web-site directory does not contain a file that corresponds to the selected base web-site file (corresponding to the "No" branch of step 424), then the base web-site file is interpreted as part of creating the derivative web-site (step 425). In one sense the process may be described in terms of the following file access and management operations:

Request for a file arrives at the derivative site;
Is there a deletion record for that file? If so, return response 404—not found;
Is there a rename record for that file? If so, send the request down the chain to try to retrieve the file using its former name from a base site;
Is there a file existing in the derivative site by that name? If so, return it;
Otherwise, pass the request along the chain to the parent site, and repeat these steps in the next site in the chain.

Next, the process checks to determine whether any unprocessed base web-site files remain in the base web-site directory (step 428). If an unprocessed base web-site file does remain in the directory, then the process passes control back to step 422 (corresponding to the "Yes" branch of step 428). However, if there are no unprocessed base web-site files in the directory, then the process passes control to step 430 (corresponding to the "No" branch of step 428).

At step 430 the process determines if there are any remaining unprocessed derivative web-site files in the derivative web-site directory. If an unprocessed derivative web-site file does remain in the directory, then the process passes control to step 431 (corresponding to the "Yes" branch of step 430), where the derivative web-site file is interpreted. After processing the unprocessed derivative web-site file by interpreting it, control is passed back to step 430. However, if there are no unprocessed derivative web-site files in the directory, then the process passes control to step 432 (corresponding to the "No" branch of step 430), at which point the processing described with reference to FIGS. 4(a) and 4(b) ends.

Figure 5:
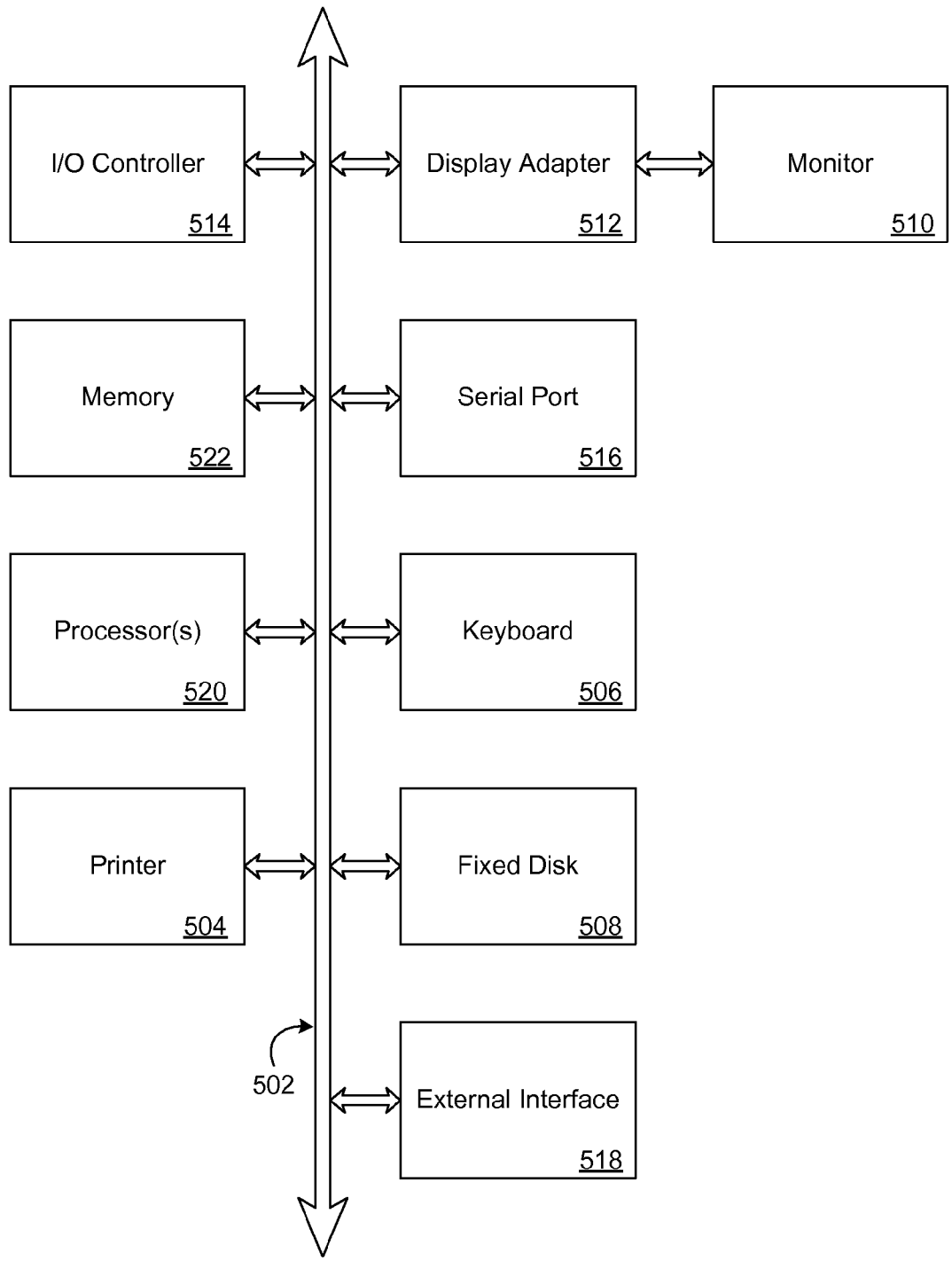
FIG. 5 is a diagram illustrating elements that may be present in a computing apparatus, system, or architecture 500 which may be configured to implement one or more functions, methods, operations, or processes in accordance with an embodiment of the inventive system and methods.

FIG. 5 is a diagram illustrating elements that may be present in a computing apparatus, system, or architecture 500 which may be configured to implement one or more functions, methods, operations, or processes in accordance with an embodiment of the inventive system and methods. The architecture 500 includes subsystems interconnected via a system bus 502. The subsystems may include a printer 504, a keyboard 506, a fixed disk 508, and a monitor 510, which is coupled to a display adapter 512. Peripherals and input/output (I/O) devices, which couple to an I/O controller 514, can be connected to the computing architecture or computer system by any number of means known in the art, such as a serial port 516. For example, the serial port 516 or an external interface 518 can be utilized to connect the computing system or device 500 to further devices and/or systems not shown in FIG. 5 including a wide area network such as the Internet, a mouse input device, and/or a scanner. The interconnection via the system bus 502 allows one or more processors 520 to communicate with each subsystem and to control the execution of instructions that may be stored in a system memory 522 and/or the fixed disk 508, as well as the exchange of information between subsystems. The system memory 522 and/or the fixed disk 508 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, JavaScript, C++, or Perl, using, for example, conventional or object-oriented techniques. The software code may be stored as a series of instructions, or commands on a computer readable medium, such as a random access memory (RAM) a read-only memory (ROM), a magnetic medium such as a hard-drive, a solid-state device such as a flash memory drive, or an optical medium such as a CD-ROM. Any such computer readable medium may reside on or within a single computational apparatus, and may be present on or within different computational apparatuses within a system or network.

Exemplary embodiments of the present methods and systems have been described in detail above and in the accompanying figures for illustrative purposes. However, the scope of the present methods and systems are defined by the claims below and is not limited to the embodiments described above or depicted in the figures. Embodiments differing from those described and shown herein, but still within the scope of the defined methods and systems are envisioned by the inventors and will be apparent to persons having ordinary skill in the relevant art in view of this specification as a whole. The inventors intend for the defined methods and systems to be practiced other than as explicitly described herein. Accordingly, the defined methods and systems encompass all modifications and equivalents of the subject matter as permitted by applicable law.

What is claimed is:

1. A method for creating a derivative version of a base website, the base website being generated by a server interpreting base website content stored in a base directory as a first base file and a second base file, the derivative version of the base website including modifications to the base website content, the method comprising:
    (a) defining a derivative directory corresponding to the base directory, the derivative directory being configured to store derivative files separate from the first base file and the second base file, wherein the derivative files comprise at least a first derivative file comprising a modification to the base website content included in the first base file;
    (b) creating the first derivative file to correspond to the first base file, wherein the first derivative file comprises a modification to the base website content of the first base file;
    (c) storing the created first derivative file in the derivative directory to establish a relationship between the created first derivative file and the first base file; and
    (d) creating the derivative version of the base website by causing the server to:
        (i) determine that the first derivative file is located in the derivative directory;
        (ii) in response to determining that the first derivative file is located in the derivative directory corresponding to the base directory, interpret the first derivative file instead of the first base file to generate a portion of the derivative version of the base website; and
        (iii) based on an absence of a corresponding derivative file for the second base file from the derivative directory, interpret the second base file to generate another portion of the derivative version of the base website.

2. The method of claim 1, wherein the first derivative file contains one or more of static content, dynamic content, or template content.

3. The method of claim 2, wherein the static content includes one or more of an image or text.

4. The method of claim 2, wherein the dynamic content includes one or more of a script or an application.

5. An apparatus for creating a derivative version of a base website, the base website being generated by interpreting base website content stored in a base directory as a first base file and a second base file, the derivative version of the base website including modifications to the base website content, wherein the apparatus comprises:
    a processor programmed to execute a set of instructions,
    a computer readable medium in communication with the processor, wherein the computer readable medium stores the set of instructions, wherein when executed by the processor the set of instructions cause the apparatus to, for the derivative version of the base website to be created,
        (a) define a derivative directory corresponding to the base directory, the derivative directory being configured to store derivative files separate from the first base file and the second base file, wherein the derivative files comprise at least a first derivative file comprising a modification to the base website content included in the first base file;
        (b) create the first derivative file to correspond to the first base file, wherein the first derivative file comprises a modification to the base website content of the first base file;
        (c) storing the created first derivative file in the derivative directory to establish a relationship between the created first derivative file and the first base file; and
        (d) create the derivative version of the base website by causing the apparatus to:
            (i) determine that the first derivative file is located in the derivative directory;
            (ii) in response to determining that the first derivative file is located in the derivative directory corresponding to the base directory, interpret the first derivative file instead of the first base file to generate a portion of the derivative version of the base website; and
            (iii) based on an absence of a corresponding derivative file for the second base file from the derivative directory, interpret the second base file to generate another portion of the derivative version of the base website.

6. The apparatus of claim 5, wherein the first derivative file contains one or more of static content, dynamic content, or template content.

7. The apparatus of claim 6, wherein the static content includes one or more of an image or text.

8. The apparatus of claim 6, wherein the dynamic content includes one or more of a script or an application.

9. A system for creating a derivative version of a base website, the base website being generated by interpreting base website content stored in a base directory as a first base file and a second base file, the derivative version of the base website including modifications to the base website content, wherein the system comprises:
    a at least one computer readable medium storing a base website directory and a derivative website directory, the base website directory containing a first base website content file and a second base website content file, the derivative website directory containing a first derivative website content file corresponding to the first base website content file; and
    a computer processor connected to at least one memory that stores executable instructions that, when executed, cause the system to receive a request for the derivative version of the base website and, in response to receiving the request, to:

(i) determine that the first derivative website content file is located in the derivative website directory;

(ii) in response to determining that the first derivative website content file is located in the derivative website directory, interpret the first derivative website content file instead of the first base website content file to generate a portion of the derivative version of the base website; and (iii) based on an absence of a corresponding derivative website content file for the second base website content file from the derivative website directory, interpret the second base website content file to generate another portion of the derivative version of the base website.

10. The system of claim 9, wherein the system includes at least one server and the request is received from a browser application.

11. The system of claim 9, wherein the first derivative website content file contains one or more of static content, dynamic content, or template content.

12. The system of claim 11, wherein the static content includes one or more of an image or text.

13. The system of claim 11, wherein the dynamic content includes one or more of a script or an application.

14. The system of claim 9, wherein the first derivative website content file includes a reference to the first base website content file.

15. The system of claim 9, further comprising;
a client device communicating with the computer processor over a network; and
a browser application installed in the client device, the browser application configured to generate the request for the derivative version of the base website in response to a user input.

16. The system of claim 15, wherein the client device is one of a desktop computer, a laptop computer, a tablet computer, a personal digital assistant, a smartphone, or a cell phone.

17. The system of claim 15, wherein the network includes the Internet.

18. The system of claim 15, wherein the browser application installed in the client comprises instructions for rendering the derivative version of the base website using at least the first base website content file from the base website directory and using at least the first derivative website content file from the derivative website directory.

* * * * *